United States Patent [19]

Hoffart

[11] 4,099,794

[45] Jul. 11, 1978

[54] TRACK PAD

[76] Inventor: Ronald J. Hoffart, Box 124, Casselton, N. Dak. 58012

[21] Appl. No.: 668,822

[22] Filed: Mar. 22, 1976

[51] Int. Cl.² .................................... B62D 55/20
[52] U.S. Cl. .................................. 305/13; 305/45; 305/58 R
[58] Field of Search ................ 305/13, 34, 45, 39, 305/58 R, 57, 56, 54, 53, 55

[56] References Cited

U.S. PATENT DOCUMENTS

| 1,383,356 | 7/1921 | Weier | 305/56 X |
| 1,915,561 | 6/1933 | Van Derveer | 305/55 UX |
| 1,931,522 | 10/1933 | Barnes et al. | 305/45 X |
| 2,680,421 | 6/1954 | Baker | 305/56 X |
| 3,497,271 | 2/1970 | Keller | 305/56 X |

FOREIGN PATENT DOCUMENTS 964,661   5/1957   Fed. Rep. of Germany ......... 305/56

Primary Examiner—Robert B. Reeves
Assistant Examiner—John P. Shannon
Attorney, Agent, or Firm—Schroeder, Siegfried, Ryan, Vidas & Steffey

[57] ABSTRACT

A track pad, a plurality of which when interconnected comprise an endless track for entrainment about a pair of tandem tired wheels, each track pad having a pair of spaced downwardly diverging transversely extending grouser bars and a single rigid link at each side fixed at one end to a tire protective plate which carries the grouser bars, and pivotally connected at its other end to the pin of a fixed clevis carried by the corresponding tire protective plate of the adjacent track pad, the fixed link and clevis at each side being the sole interconnecting means between adjacent track pads.

16 Claims, 7 Drawing Figures

TRACK PAD

It is a general object of my invention to provide a novel and improved endless track belt capable of improved performance.

A more specific object is to provide an endless track belt which is simple and relatively inexpensive in construction, assembly and repair and which will perform in an improved manner.

Another object is to provide a novel and improved track pad having improved self-cleaning features.

Another object is to provide a novel and improved track pad constructed and arranged to equalize and transmit to adjacent pads unusual and extreme pressures.

Another object is to provide a novel and improved track pad which will provide improved protection to the tire with which it is to be used.

Another object is to provide a novel and improved track pad constructed and arranged to preclude individual tilting with consequent undue strain upon the machine and the track.

These and other objects and advantages of my invention will more fully appear from the following description, made in connection with the accompanying drawings, wherein like references characters refer to the same or similar parts throughout the several views, in which.

Figure 1:
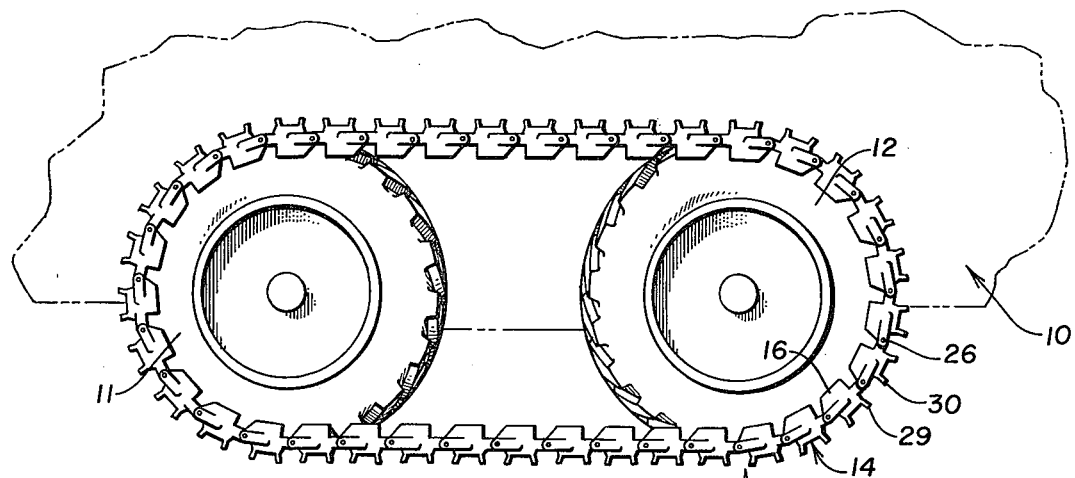
FIG. 1 is a side elevational view showing a vehicle supported by a pair of tired wheels in tandem and entrained by an endless track comprised of a plurality of my novel track pad.

My invention is designed to be utilized as shown in FIG. 1 in which a vehicle, indicated generally by the numeral 10, is supported by a pair of rubber tired wheels 11 and 12 about which an endless track 13 is entrained. The track 13 is comprised of a plurality of track pads of the type shown in FIGS. 2-4, one of which has been indentified generally by the numeral 14.

Figure 2:
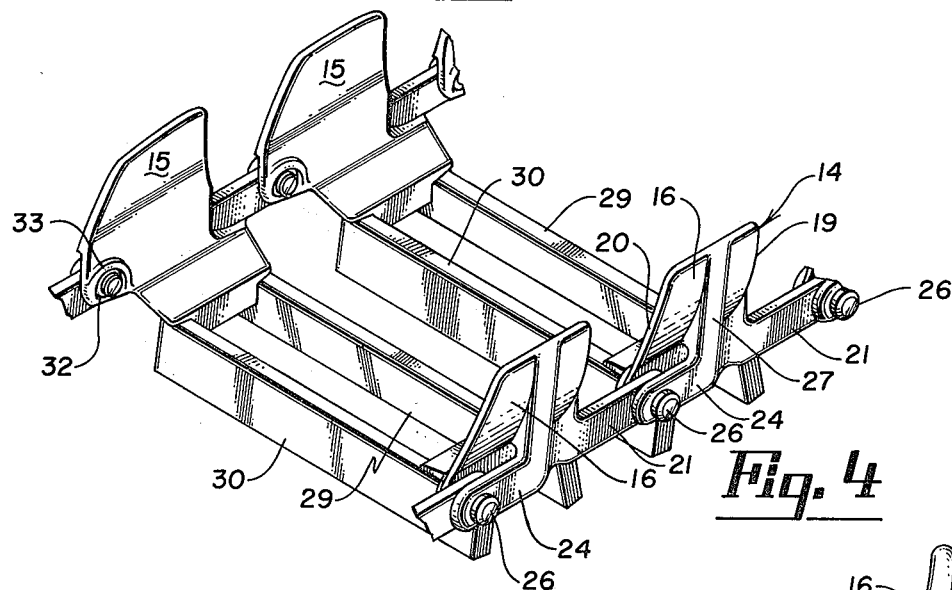
FIG. 2 is a perspective view of a portion of an endless track made up of a plurality of my novel track pads.
Figure 3:
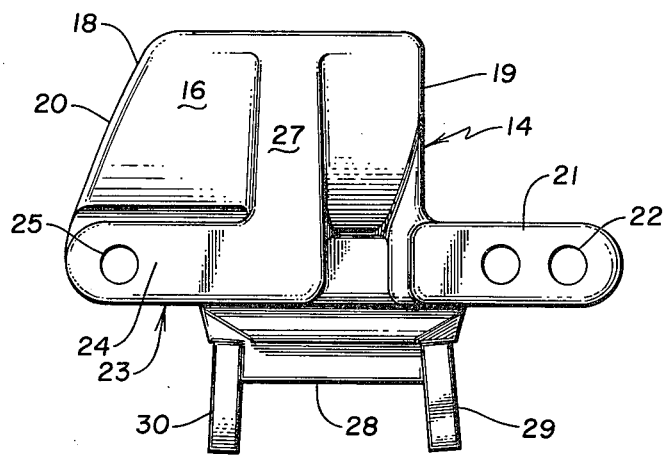
FIG. 3 is an end elevational view of one of my novel track pads.
Figure 4:
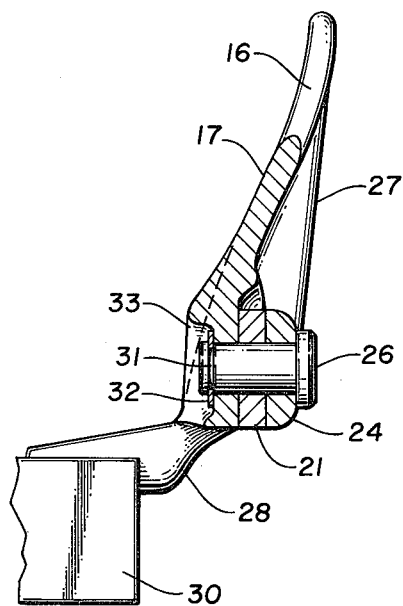
FIG. 4 is a fragmentary, vertical sectional view taken through one of the pivotal connections between two of my track pads.

As best shown in FIGS. 2-4, my novel track pad is comprised of a pair of transversely spaced upright tire protector plates 15-16 which are adapted to extend upwardly along opposite side walls of the tire with which it is to be used, a distance equal to the height of the maximum axial dimension of the tire, which is commonly referred to as the belly of the tire. Each of the protector plates 15-16 is substantially identical in construction except, of course, that they face in opposite directions. Each has an inner surface 17, which, as best shown in FIG. 4, extends upwardly and outwardly. Each of the plates 15, 16 is generally rectangular in shape except that one upper corner is relieved, as at 18, and each has leading and trailing portions, such as 19 and 20, depend upon the direction in which the track is driven.

Extending outwardly from one of the lower corner portions of each of the projector plates 15, 16 is a rigid link 21 which, as shown, is integrally formed with the protector plate and is provided with an aperture 22 at its other end which is adapted to receive a pivot pin therein as hereinafter described.

A clevis means, indicated generally at 23, is provided at the opposite lower corner portion of each such plate and is comprised of the opposite corner portion of the plates 16 and a clevis fork 24, which is welded to the outer surface of the plate and extends away from the link 21 in spaced relation to the outer surface of the plate, to a point opposite the lower corner. Both the plate 16 and the clevis fork 24 are provided with transversely aligned apertures such as 25 to accommodate a pivot pin 26. A vertical exterior rib 27 supports the plate 16 and the clevis fork 24.

Carried by the plate 16 and extending inwardly and horizontally therefrom, is a welding tab 28. Welded to the tab 28 is a pair of transversely extending spaced grouser bars 29 and 30. Each of these grouser bars is rectangular in cross-sectional shape and extends in downwardly diverging relation as best shown in FIGS. 2 and 3. Each of the bars 29 and 30 is similarly welded at their opposite ends to the corresponding welding tab of the plate 15. Each is welded to the respective welding tabs at locations disposed inwardly of the vertical plane of the supporting protective plate, as best shown in FIG. 4. As best shown in FIG. 2, the area between the grouser bars 29 and 30 is entirely unobstructed.

Each of the pivot pins 26 is provided at its inner end with a head 31 and an annular groove disposed inwardly thereof to receive a snap action locking ring 32. The area of the inner face of the plate 16 which immediately surrounds the inner end of the pivot pin 26 is relieved, as shown in FIG. 4, thereby creating a protective shoulder 33 which surrounds and protects the inner end 31 of the pivot pin 26 so as to prevent undue wear and consequent possible loss of the retaining or locking ring 32.

Figure 5:
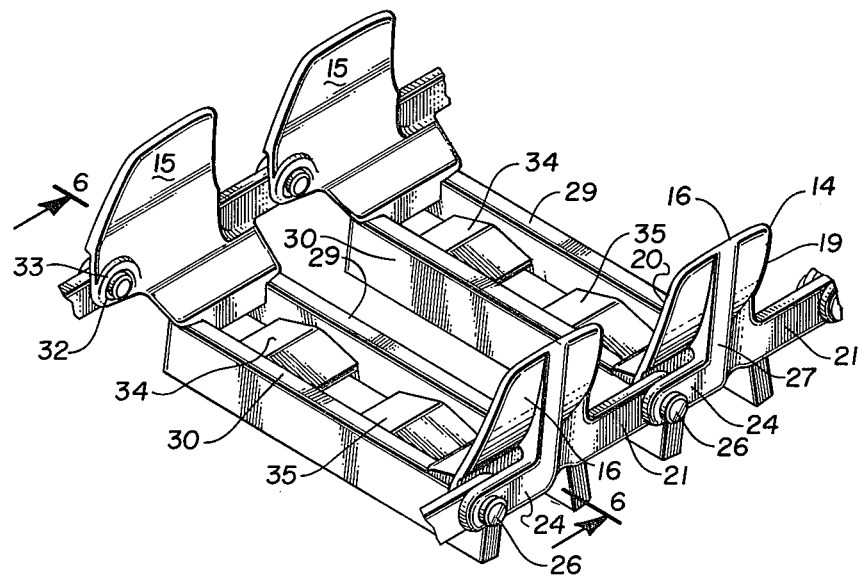
FIG. 5 is a perspective view of a portion of an endless track comprised of a modified form of my invention.
Figure 6:
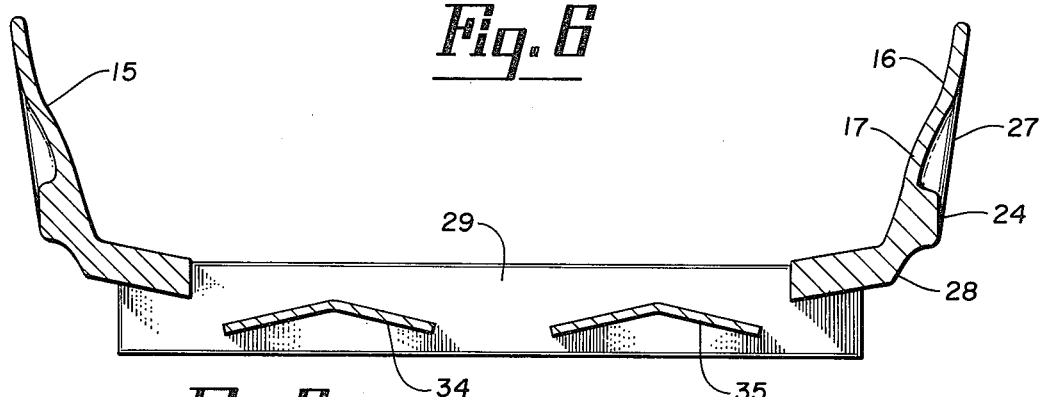
FIG. 6 is a transverse vertical sectional view taken through the middle of one of the track pads shown in FIG. 5.
Figure 7:
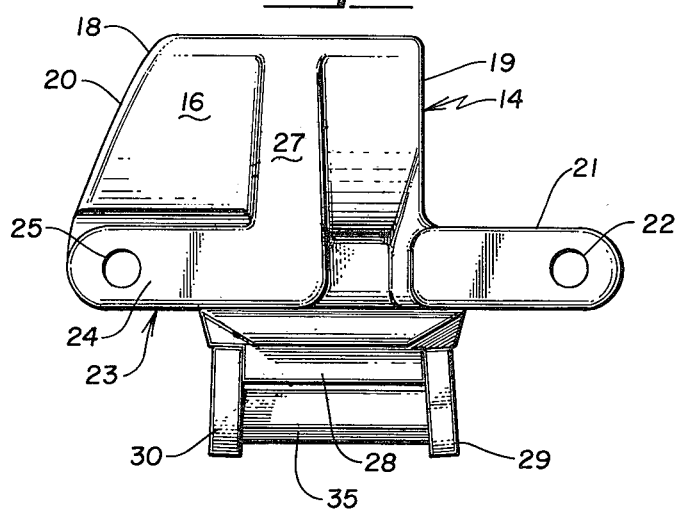
FIG. 7 is an end elevational view of one of my modified track pads shown in FIG. 5.

The modified form of my invention as shown in FIGS. 5-7, inclusive, is comprised of a track pad which is essentially identical in construction to that shown in FIG. 2, with the exception that a pair of flotation plates 34 and 35 are welded to the inner opposed surfaces of the grouser bars 29 and 30. As best shown in FIG. 6, the flotation plates 34 and 35 are generally chevron-shaped in cross-section and they are located in spaced relation to each other and with respect to the end portions of the grouser bars. The purpose and function of these plates is to provide added flotation characteristics to the track when it is to be used in areas of soft sand, boggy soil, etc.

As shown in FIG. 2, a plurality of my track pads may be connected in a simple and effective manner by merely inserting the rigid links 21 of a plurality of pads into the clevis means 23 for interconnection by the insertion of the pivot pin 26. The pivot pin 26 may be inserted relatively easily manually and can likewise be removed upon removal of the retaining ring lock 32. Once the track pads have been interconnected as shown in FIG. 2, they complete an endless track as shown in FIG. 1, which entrains the tired wheels 11 and 12, as shown. It should be noted that because of the use of the links 21, which are fixedly connected to the pad, there is a pad-to-pad connection rather than a pad-to link-to pad connection as is conventional in most such tracks. This is important in providing the improved functions of my track pad for it equalizes any undue pressure or strain placed upon a track pad since a portion of that strain is necessarily transmitted, as a result of the rigid link 21 and the rigid clevis 23 to its adjacent track pads. Also, it precludes the tilting or twisting of an individual track pad relative to its adjacent track pads.

It should be noted that the protective plates 15 and 16 of each track pad are transversely spaced sufficiently to permit the tire with which it is to be used to rest upon the grouser bars 29 and 30. The grouser bars are sufficiently spaced to permit the tire to extend downwardly between them to provide an improved traction between the tire and the track, as well as between the track and the ground. The plates 15 and 16 provide added protection to the tire by the fact that they extend upwardly to the belly of the tire. The outward angle of the protector plate is provided to conform to the shape of the tire and permit contact between the tire and the track to be spread over a large area to further prevent tire damage. No part of the tire can extend outwardly over the protector plate and become damaged as a result thereof.

The relieved corner 18 of each of the protector plates is provided to facilitate the articulation of one track pad relative to the other as the pads move around the tire. This feature provides maximum tire protection, as well as maximum tire contact area.

The downwardly diverging feature of the grouser bars 29 and 30 is provided to furnish the self-cleaning feature. It will be noted that the area between the grouser bars 29 and 30 is entirely unobstructed and the diverging relation of the bars relative to each other facilitates self-cleaning of the track pads.

It will be noted that the axis of pivot of the pivot pin 26 is located as closely as possible to the grouser bar, the axis being above the grouser bars a distance substantially less than the vertical dimension of the grouser bars. This is important to limit a jawing action of the grouser bars as they articulate around the circumference of their arc of travel. Such jawing action of the grouser bars can clamp foreign material therebetween and consequently hinder the self-cleaning action of the track. Also, a jawing action exposes more of the tire to possible damage. Consequently, limiting this jawing action contributes to the cleaning of the track pad and protection of the tire.

As mentioned hereinbefore, the pad-to-pad hook-up resulting from the use of a rigid link fixedly connected to the track pad and a clevis also fixedly connected thereto prevents the pad from tipping while in the ground gripping position. This tipping condition is very common with a pad-to-link-to-pad hook-up. A tipping action of the pad results in a loss of traction and it also tightens the track, putting undesirable pressures on the machine and the track itself. The tendency to tip is precluded by the rigid link in that the pressures are transmitted to the adjacent track pads which resist such tipping movement. This is in contrast to what takes place when the link is pivotally connected to the track pad. The pad-to-pad hook-up also provides maximum lateral stability for it maintains the track in better alignment with the wheels, which is important for preventing tire damage and maintaining the track upon the wheels.

It will be noted by reference to FIG. 3 that some of the track pads have rigid links which have more than one aperture formed therein. This additional aperture is provided to enable the track to be shortened in the event that it tends to become loose as a result of prolonged wear. It should be noted that it is a simple matter to disconnect any of the track pads in the track unit by simply removing the retaining ring 32 and pulling the pin 26 which has a free fit in the apertures of the link 21 and the clevis 23.

It will, of course, be understood that various changes may be made in the form, details, arrangement and proportions of the parts without departing from the scope of my invention which consists of the matter shown and described herein and set forth in the appended claims.

I claim:

1. A track pad of rigid construction for use with vehicles having tired wheels comprising:
   (a) a pair of transversely spaced upright tire protector plates of generally rectangular shape and having leading and trailing portions;
   (b) grouser bar means carried by said plates at their lower end portions and extending therefrom for engaging the ground and for providing traction for such wheels and being of such length as to permit the tire with which it is to be used to extend downwardly between said plates and engage said grouser bar means;
   (c) a rigid link carried by one of said leading and trailing portions of each of said plates in essentially fixed relation thereto and extending outwardly from the lower portion thereof for connection to another track pad, said link having an aperture therein adapted to receive a pivot pin therein to accomplish such a connection, and
   (d) clevis means carried by the other of said leading and trailing position of each of said plates in essentially fixed relation thereto for pivotally connecting the same to the link of an adjacent track pad and adapted to receive such a rigid link to another track pad and a pivot pin therein for connection to such other track pad.

2. The structure defined in claim 1 wherein said rigid links extend outwardly from a position closely adjacent to said grouser bar means.

3. The structure defined in claim 1 wherein one of said rigid links extends outwardly from corresponding lower corner portions of each of said protector plates and said clevis means of each of said plates is carried by the opposite lower corner portions of said plates.

4. The structure defined in claim 1 wherein one of the corresponding upper corner areas of each of said protector plates is relieved to facilitate articulation of the track pad relative to another track pad when the latter is connected thereto by said clevis means.

5. The structure defined in claim 1, and
   (e) a horizontally extending welding tab carried by the lower portion of each of said protector plates and extending inwardly therefrom toward the other of said plates;
   (f) said grouser bar means incuding a pair of spaced generally parallel grouser bars extending between said plates and welded to one of said welding tabs at each of their ends.

6. The structure defined in claim 1,
   (e) said grouser bar means including a pair of generally parallel elongated spaced grouser bars, the space between said bars being entirely unobstructed; and (f) said grouser bars being rectangular in cross-section and extending in downwardly diverging relationship to provide a self-cleaning function.

7. the structure defined in claim 1,
(e) said clevis means of each of said plates being comprised of an apertured lower corner portion of said plate and an apertured clevis fork member welded to the lower intermediate portions of said plate and extending outwardly therefrom along and in spaced relation to the outer surface of said lower corner portion, with said apertures being aligned to receive a pivot pin therein.

8. The structure defined in claim 1 wherein said link has a plurality of apertures therein spaced longitudinally of said link and each adapted to receive a pivot pin therein to enable such a connection with another track pad to be accomplished about the axis of whichever aperture is desired.

9. The structure defined in claim 7 wherein the inner surface area of each of said plates immediately surrounding the aperture of said apertured lower corner portion is relieved whereby a protective shoulder for the terminal portion of a pivot pin received in said apertures is provided by the portion of said inner surface area of said plate immediately surrounding said relieved area.

10. The structure defined in claim 1 wherein each of said protective plates extends upwardly a distance sufficient to extend to the widest axial dimension of the tire with which they are to be used.

11. The structure defined in claim 6 wherein each of said protector plates have inner tire protective surfaces which extend upwardly and outwardly and are spaced sufficiently from each other to permit the tire with which they are to be used to rest upon said grouser bars and extend downwardly therebetween.

12. The structure defined in claim 6 wherein said grouser bars are spaced sufficiently to permit the tire with which they are to be used to extend downwardly therebetween.

13. The structure defined in claim 5 wherein said grouser bars each terminate inwardly of the vertical planes of said protector plates.

14. The structure defined in claim 6, and
(g) a plurality of transversely spaced flotation plates mounted upon said grouser bars and extending therebetween.

15. A track pad of rigid construction for use with vehicles having tired wheels comprising:

(a) a pair of transversely spaced upright tire protector plates of generally rectangular shape and having leading and trailing portions;
(b) a pair of generally parallel spaced elongated grouser bars carried by said plates at their lower end portions and extending therebetween;
(c) said grouser bars being of such spacing and length as to permit the tire with which they are to be used to extend downwardly between said plates and between said bars and rest upon the latter;
(d) the space between said grouser bars being entirely unobstructed;
(e) said grouser bars being rectangular in cross-section and extending in downwardly diverging relationship to provide a self-cleaning function;
(f) pivot means fixedly carried by each of said protector plates at each of its leading and trailing portions for pivotally connecting the same in articulated relation directly with another track pad; and,
(g) said pivot means including a rigid link fixedly mounted on one of said portions of each of said plates and extending outwardly therefrom to pivotally connect with a corresponding protector plate of an adjacent track pad.

16. A track pad of rigid construction for use with vehicles having tired wheels comprising:
(a) a pair of transversely spaced upright tire protector plates having leading and trailing portions;
(b) a pair of generally parallel spaced elongated grouser bars carried by said plates at their lower end portions and extending therebetween;
(c) said grouser bars being of such spacing and length as to permit the tire with which they are to be used to extend between said plates and between said bars and rest upon the latter;
(d) said grouser bars extending in downwardly diverging relationship to provide a self-cleaning function;
(e) pivot means including a pivot element fixedly carried by each of said protector plates at each of its leading and trailing portion for pivotally conecting the same in articulated relation directly with another track pad;
(f) each pivoting element of said pivot means being fixed with respect to its supporting protector plate; and,
(g) at least one of said pivot elements being comprised of a rigid link fixedly mounted on one of said portions of each of said protector plates and extending outwardly therefrom to pivotally connect with a corresponding protector plate of an adjacent track pad.

* * * * *

UNITED STATES PATENT AND TRADEMARK OFFICE
CERTIFICATE OF CORRECTION

PATENT NO. : 4,099,794
DATED : July 11, 1978
INVENTOR(S) : Ronald J. Hoffart

It is certified that error appears in the above–identified patent and that said Letters Patent are hereby corrected as shown below:

Column 1, line 54, delete "indentified" and insert -identified-

Column 4, line 36, delete "position" and insert - portions - line 39, delete "to" (second occurrence) and insert - of - line 60, delete "incuding" and insert - including -

Column 6, line 41, delete "conect-" and insert - connect-  --

Signed and Sealed this

Twenty-sixth Day of June 1979

[SEAL]

Attest:

RUTH C. MASON
Attesting Officer

DONALD W. BANNER
Commissioner of Patents and Trademarks